United States Patent [19]

Shontz

[11] 3,990,276
[45] Nov. 9, 1976

[54] THEFT PROTECTION DEVICE FOR APPLIANCES AND PORTABLE OFFICE EQUIPMENT

[76] Inventor: Richard F. Shontz, P.O. Box 572, Redwood City, Calif. 94063

[22] Filed: May 14, 1975

[21] Appl. No.: 577,219

[52] U.S. Cl. ................................ 70/58; 70/49; 70/174; 24/115 R; 24/128 K; 24/211 M; 248/25; 403/252
[51] Int. Cl.² ............................................ E05B 73/00
[58] Field of Search ......... 24/115 R, 128 K, 211 M, 24/132 CL; 70/14, 18, 39, 49, 56, 57, 58, 229, 232, DIG. 56, DIG. 57, DIG. 58, 174; 248/25, 203, 499, 500, 505; 403/252, 291, 321, 323, 360

[56] References Cited
UNITED STATES PATENTS

| 868,082 | 10/1907 | Freschl | 24/211 M |
|---|---|---|---|
| 1,217,640 | 2/1917 | Roebuck | 403/321 X |
| 1,546,306 | 7/1925 | Ofstedahl | 24/132 CL |
| 1,957,557 | 5/1934 | Schwahn | 70/232 |
| 2,440,012 | 4/1948 | Haver | 403/360 X |
| 2,719,750 | 10/1955 | Orr | 403/252 X |
| 3,664,616 | 5/1972 | Raskin | 70/58 X |
| 3,765,197 | 10/1973 | Foote | 70/232 X |
| 3,771,338 | 11/1973 | Raskin | 70/58 |
| 3,808,847 | 5/1974 | Vesely | 70/56 X |
| 3,859,826 | 1/1975 | Singer et al. | 70/58 |

FOREIGN PATENTS OR APPLICATIONS

| 1,045,219 | 11/1953 | France | 70/232 |

Primary Examiner—Paul R. Gilliam
Assistant Examiner—Carl F. Pietruszka
Attorney, Agent, or Firm—James R. Cypher

[57] ABSTRACT

The device consists briefly of a short length of flexible cable having an enlargement on at least one end which is releasably attached to a hold-down bar which is affixed to an anchoring object. A lock cover completely envelopes the entire mechanism attached to the anchoring object. The cable permits 360° rotational movement about the axis of the cable and limited movement parallel to the horizontal anchoring object surface but prevents all but minimal movement away from the anchoring object.

10 Claims, 15 Drawing Figures

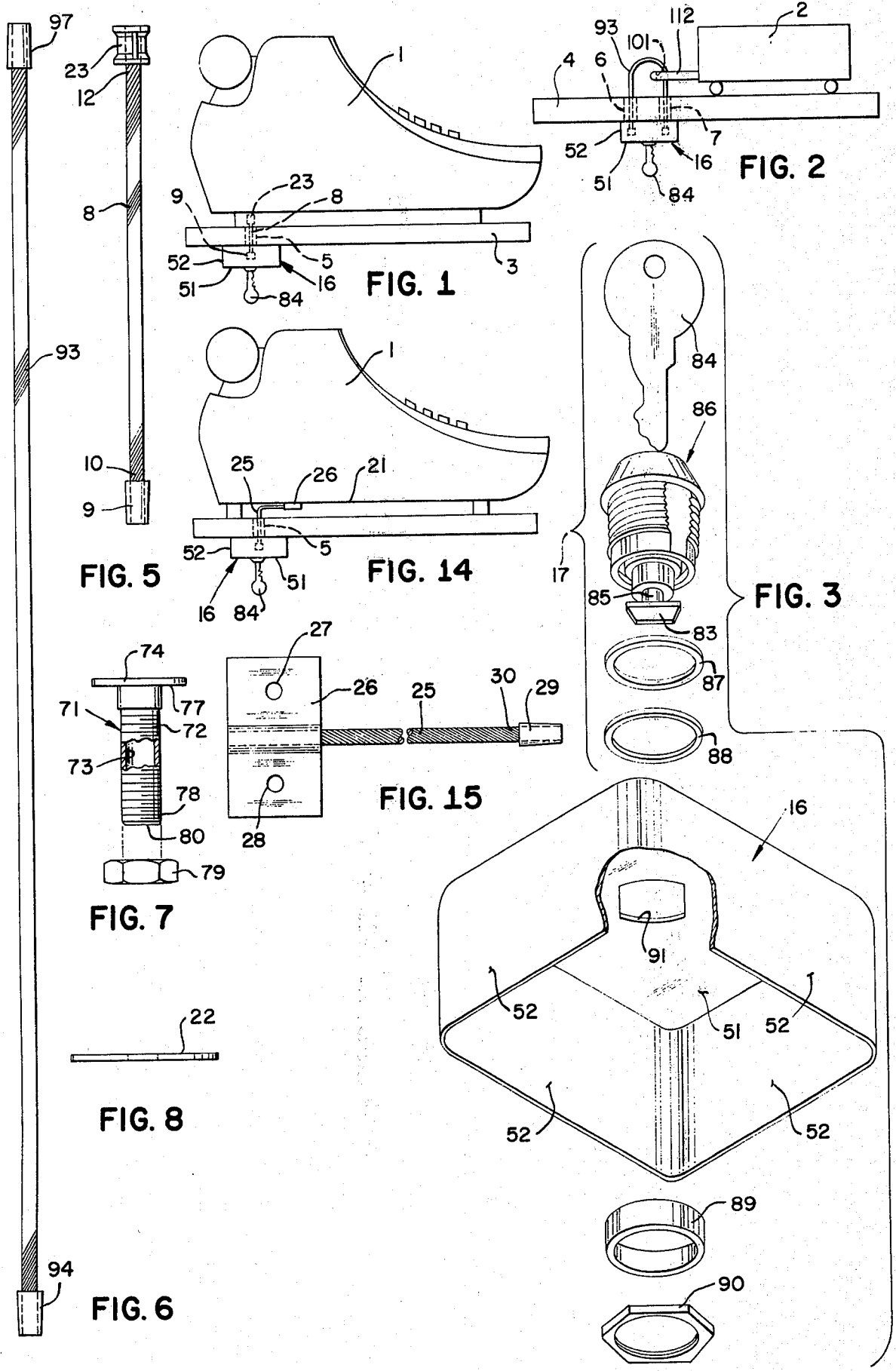

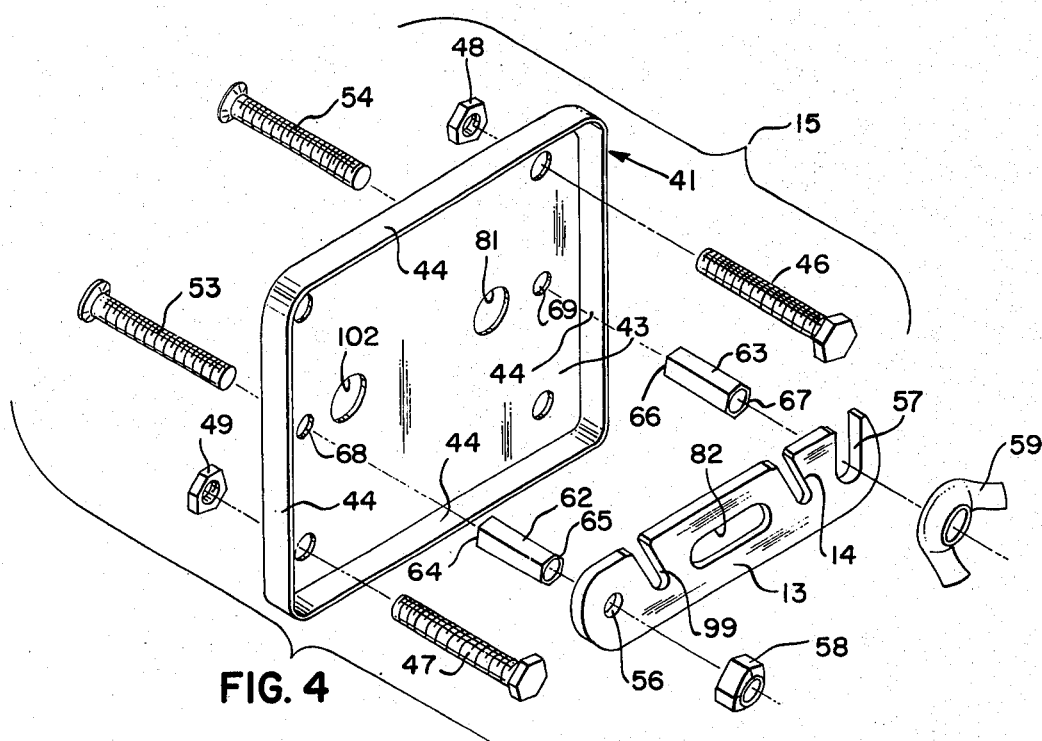
FIG. 4
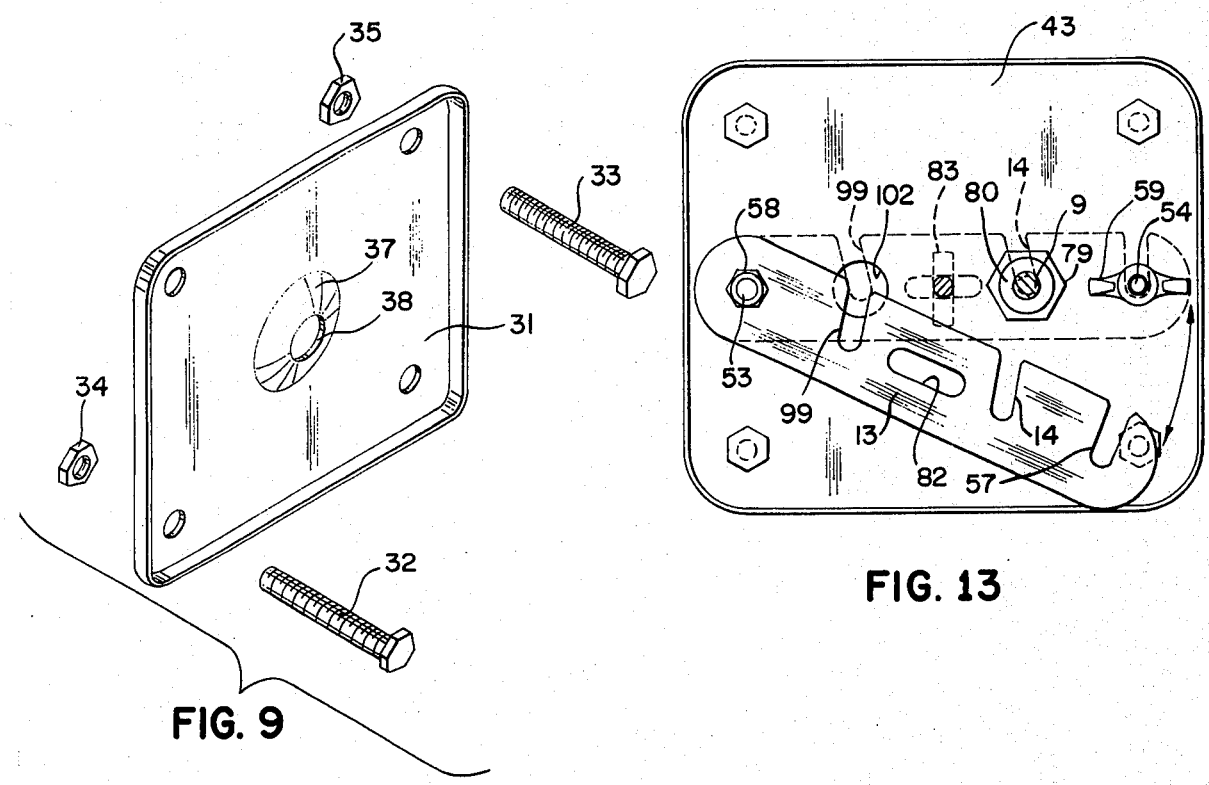
FIG. 9
FIG. 13

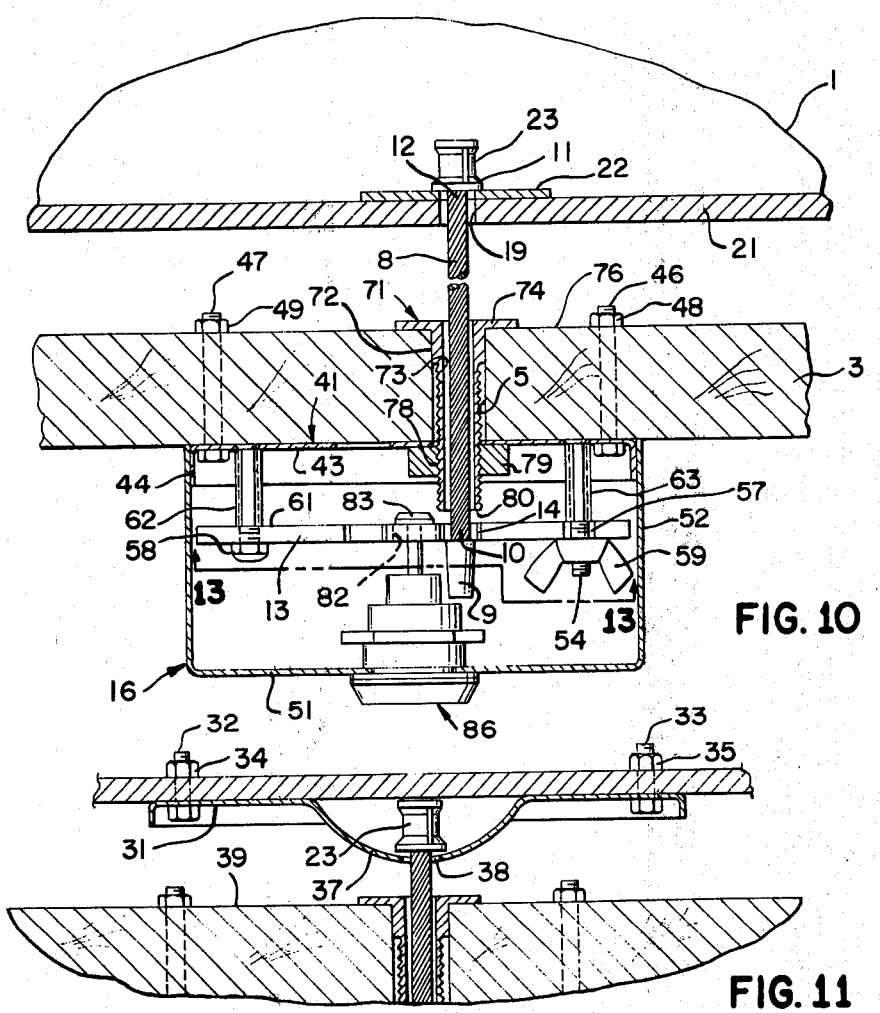
FIG. 10
FIG. 11
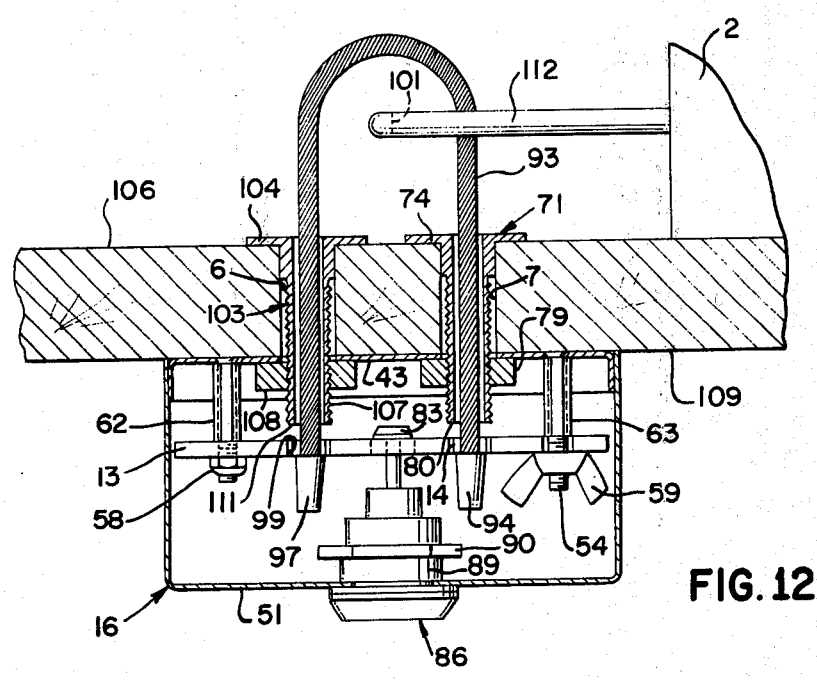
FIG. 12

THEFT PROTECTION DEVICE FOR APPLIANCES AND PORTABLE OFFICE EQUIPMENT

BACKGROUND OF THE INVENTION

This invention relates to devices for deterring thefts of appliances and office equipment. More specifically, the device is characterized by a short length of flexible cable which is very difficult to cut. Prior devices using a cable are tethering devices in which both ends of the cable must be secured by expensive lock mechanisms, and the cable is exposed so that heavy bolt cutters may be used to sever the cable.

SUMMARY OF THE INVENTION

The gist of the present invention is to secure an appliance or a portable business machine to a desk or table by means of a short length of cable so that the appliance or machine may be rotated and shifted a short distance horizontal to the desk top but the machine cannot be pivoted or lifted vertically above the desk a sufficient distance to insert a pair of bolt cutters to sever the cable.

An object of the present invention is to provide an inexpensive system for locking appliances and machines to a table top or desk which only requires a single small hole to be drilled through the table or desk top.

Another object of the present invention is to provide a device in which one end of a cable is attached to the equipment using standard fasteners.

A further objective is to provide theft protection for office machines, audio/visual equipment and other valuable portable machines by a device which provides maximum protection with maximum operational convenience, at low cost.

A still further objective is to permit immediate release by key for maintenance yet permit limited movement of the machine.

Still another objective is to provide a tamper-proof, all-steel construction, cadmium plated, corrosion resistant device which is adaptable to secure all sizes and types of office machines and equipment.

Another objective is to provide a simple, no maintenance device which is either invisible or unobtrusive and always out of the way in the daily operation of an office.

BRIEF DESCRIPTION OF THE DRAWINGS

FIG. 1 is a side view of a typical installation using the device of the present invention.

FIG. 2 is a side view of an installation using an alternate form of the invention.

FIG. 3 is an exploded view of a portion of the device shown in FIGS. 1 and 2.

FIG. 4 is an exploded view of a portion of the device shown in FIGS. 1 and 2 which mates with the portion of the device shown in FIG. 3.

FIG. 5 is a side view of the cable used in the form of the invention shown in FIG. 1.

FIG. 6 is a side view of the cable used in the form of the invention shown in FIG. 2.

FIG. 7 is a side view of the bushing used in both forms of the invention shown in FIG. 2.

FIG. 8 is a side view of the washer used in the form of the invention shown in FIGS. 1 and 5.

FIG. 9 is an exploded isometric view of a portion of another alternate form of the invention.

FIG. 10 is a sectional view of the invention shown in FIG. 1 taken approximately along the center line of the device and showing portions of the machine secured and the anchoring object.

FIG. 11 is a cross section of a portion of an alternate form of the invention showing the plate shown in FIG. 9.

FIG. 12 is a cross section of the device shown in FIG. 2 taken approximately along the center line of the device and showing a portion of the machine secured and a portion of the anchoring object.

FIG. 13 is a bottom view of a portion of the device shown in FIG. 10 taken along line 13 — 13 with the hold-down arm in solid line showing the unlocked position and the dotted line showing the arm in the locked position.

FIG. 14 is a side view of still another alternate form of the invention.

FIG. 15 is a bottom view of the alternate form of a portion of the device shown in FIG. 14.

BRIEF DESCRIPTION OF THE PREFERRED EMBODIMENTS OF THE INVENTION

The theft protection device of the present invention for appliances and other portable equipment having a housing such as the typewriter 1 or projector 2 for locked connection to an anchoring object such as a desk top 3 or a table top 4, each having an opening 5 and openings 6 and 7 respectively consists briefly of an elongated flexible cable 8 having an enlarged cable head 9 permanently affixed to one end 10; equipment attachment means 11 attached to the other end 12 of said cable and adapted for attachment to the equipment; a hold-down arm 13 having a slot 14 therein having a width greater than the diameter of the flexible cable but less than the diameter of the cable head; means 15 for holding the hold-down arm stationary relative to the anchoring object and in a position for preventing return movement of the first head through the opening in the anchoring object; a lock cover 16 shielding the hold-down arm, enlarged head and means for holding the hold-down arm relative to the anchoring object; and lock means 17 for securing the lock cover stationary relative to the hold-down arm.

The equipment attachment means 11 as shown in FIG. 10 consists of an opening 19 either drilled or previously formed in the housing 1 or base 21 of the housing and a washer 22 where required to prevent the enlarged head 23 placed on end 12 of the cable from being pulled through opening 19.

Another form of the equipment attachment means is shown in FIGS. 14 and 15 and consists of a plate 26 attached to the equipment by means of screws, rivets or other fasteners through openings 27 and 28, wherein the flexible cable 25 is held in a position substantially parallel to the base 21 of the equipment before it is inserted into the opening 5. The cable may be attached to the plate 26 by soldering, swaging or both. An enlarged head 29 is attached to end 30 of the cable. Except for the substitution of plate 26 for an enlarged head 23, the invention shown in FIGS. 14 and 15 is identical to the invention shown in FIGS. 4, 10 and 13.

Still another form of the equipment attachment means is shown in FIGS. 9 and 11 and consists briefly of an equipment-cable hold plate 31 adapted for attachment by fasteners such as bolts 32 and 33 and nuts 34 and 35 to the appliance or equipment and formed with an offset portion 37 for receiving the second enlarged head 23. The offset portion is formed with an opening 38 therethrough for receiving the first head and cable therethrough but having a diameter less than the diameter of the second head. The cable has a length preventing substantially all movement of the equipment or appliance away from the surface 39 of the anchoring object to prevent access to the fasteners attaching the equipment-cable hold plate to the equipment.

Referring to FIG. 10, the second cable head 23 has a diameter greater than opening 19 formed in the appliance or equipment and the first cable head 9 has a diameter smaller than opening 19 of the appliance. The hold-down arm 13 has a slot having a width greater than the diameter of the flexible cable 8 but less than the diameter of the first cable head 9. A securing lock plate 41 adapted for connection to the underside of the anchoring object such as the surface 42 has a base 43 and downwardly turned flanges 44 around the entire base. The base may be attached to the surface 42 as by bolts 46 and 47 and nuts 48 and 49 or the nuts and bolts may be eliminated and the plate may be merely secured to the surface by a threaded bushing and nut to be described below. The lock cover includes a top 51 and sides 52 extending upwardly for nesting engagement with the flanges on the base to prevent any tools from being inserted into the box.

Referring to FIGS. 4, 10 and 13, the means for holding the hold-down arm may include a plurality of studs 53 and 54 connected to the base 43 and extending outwardly therefrom. The hold-down arm is formed with openings 56 and 57 for registration with the studs 53 and 54. Means are provided for releasably attaching the hold-down arm to the studs which here consist of an internally threaded nut 58 for threadable receipt on threaded stud 53, and wing nut 59 which is threadably received on threaded stud 54. Preferably, opening 57 is a slot. The studs 53 and 54 could be formed with shoulders for receiving face 61 of arm 13 or a pair of spacers 62 and 63 may be provided for receipt of studs 53 and 54 therethrough. Spacers 62 and 63 are preferably internally threaded so that the spacing of hold-down arm from base 43 may be adjusted by merely turning the spacers about threaded studs 53 and 54. End 64 rests on base 43 and end 65 rests against surface 61 of arm 13. In like manner, end 66 of spacer 63 rests on the base and end 67 rests on the underside face 61 or arm 13. Studs 53 and 54 may be welded to the base or inserted through openings 68 and 69 in the base.

Referring to FIGS. 7 and 10, the device is provided with a bushing 71 having an outside diameter dimensioned for insertion of the outerwall 72 in close fitting relation with an opening 5 formed in the anchoring object. The bushing has an inside opening 73 having a diameter dimensioned for receipt of the first enlarged head 9 and cable 8 therethrough.

The bushing has a flange 74 on the end adjacent the cable end with the second enlarged head 23 adapted for contacting the upper surface 76 of the anchoring object with the undersurface 77 of the flange. The end 78 of the bushing adjacent the securing plate is threaded for receiving a threaded nut 79 adapted for holding the base 43 against the underside 42 of the anchoring object. The bushing has a length such that the end 80 adjacent the first cable end 9 terminates just short of the hold-down arm. An opening 81 is provided in base 43 for receipt of bushing 71 therethrough.

Referring to FIGS. 3, 4, 10 and 13, the hold-down arm is formed with an elongated slot 82 and the lock means includes a lock bar 83 on shaft 85 dimensioned for movement through the elongated slot in a first position and locking engagement with the hold-down arm when rotated in a second position.

Lock means 17 consists of a key 84, a lock 86, shims 87 and 88, spacer 89 and threaded nut 90. The lock assembly is inserted through opening 91 in the top of the cover 16.

Another form of the invention is shown in FIG. 2. With slight modification as shown in FIGS. 4, 12 and 13 all of the same parts may be utilized to attach objects such as projectors which have handles 112 to the anchorage object.

In this form of the invention, the anchorage object is formed with two openings 6 and 7. The device consists of an elongated flexible cable 93 having a first enlarged cable head 94 permanently affixed to one end 96 and a second enlarged cable head 97 permanently affixed to the other end 98. The hold-down arm has a pair of spaced slots 14 and 99 therein wherein the slots have a width greater than the diameter of the flexible cable but less than the diameters of the first and second cable heads. The means for holding the hold-down arm stationary relative to the anchoring object and in a position for preventing movement of the first and second heads through the openings in the anchoring objects is identical to the means previously described and is not here repeated. The drawing shows identical parts carrying identical numbers.

The cable has a length sufficient to have the ends held by the hold-down arm and to loop through the opening 101 in the portable equipment or appliance. The cable heads 94 and 97 have diameters less than the opening in the portable equipment or appliance.

The lock cover and lock means are identical to these parts previously described and the drawings show identical numbers for identical parts.

The securing lock plate 43 is identical as previously described except that it is provided with an additional opening 102 for receipt of the second bushing 103 therethrough. Each of the bushings are dimensioned for insertion through the openings in the anchoring object and have an inside diameter for receiving the first enlarged head and cable therethrough. The second bushing has a flange 104 on the end adapted for contacting the upper surface 106 of the anchoring object. The end of the second bushing 107 is threaded for receiving a threaded nut 108 for holding the base against the underside 109 of the anchoring object. The first and second bushing have ends 80 and 111 which terminate just short of the hold-down arm.

INSTALLATION

The theft protection device above described is adaptable to fit most office machines or professional equipment such as typewriters, calculators, tape recorders etc. and to secure them to table and counter tops from ¾ inch to 1 inch thick. Portable handle type equipment such as slide projectors etc. can also be protected usng the loop attachment.

To install the device, the best location for the base in regard to ease of access and point of attachment to the equipment is selected. A ¼ inch hole is then drilled in the equipment case and the small end of the 4 inch cable is fed through the washer and hole. The table top directly under the cable is then marked and one ⅜ inch diameter hole is drilled for the threaded bushing. The bushing is then inserted through the table top and the base plate is mounted on the bushing under the table with a nut. The cable is then fed from the equipment through the bushing beyond the hold-down bar. The hold-down bar is then rotated and the wingnut tighted. Even if the cable is loose, it cannot slip out from the slot as long as the end 80 of the bushing is relatively close to the underside of the hold-down arm. The cover is then installed, the key turned 90° to lock, the key is removed and the equipment is completely locked in place.

To intall the lock system as shown in FIGS. 2 and 12, the baseplate is used to mark the location of two ⅜ inch diameter holes for the two threaded bushings nearest the handle. The holes are drilled and the bushings inserted from the top of the table. The base plate is then mounted on the bushings under the table with the threaded nuts. After placing the loop over the handle, the cable is fed through the bushings beyond the hold-down arm, the arm is rotated into engagement with the cable ends and the wing nut is tightened. The cover is installed, the key turned 90° and then removed.

I claim:

1. A theft protection device for appliances or other portable equipment having a housing base formed with an opening spaced inwardly from its side edges for locked connection to an anchoring object having an opening therethrough, the device comprising:
   a. an elongated flexible cable having a first enlarged cable head permanently affixed to one end; and threadably inserted through said opening in said anchoring object;
   b. equipment attachment means attached to the other end of said cable and adapted for attachment to said equipment;
   c. a hold-down arm having a slot therein having a width greater than the diameter of said flexible cable for receiving said cable through said slot but less than the diameter of said cable head for preventing passage of said head through said slot;
   d. means mounted on said anchoring object on a face opposite that of said appliance for holding said hold-down arm stationary relative to said anchoring object and in a position in alignment with said opening in said anchoring object;
   e. a lock cover connected to said anchoring object and shielding said hold-down arm, enlarged head and said means for holding said hold-down arm relative to said anchoring object;
   f. locking means for securing said lock cover stationary relative to said anchoring object; and
   g. said cable having a length permitting only minimal movement of said appliance or equipment away from the surface of said anchoring object.

2. A device as described in claim 1 comprising:
   a. said equipment attachment means consists of a plate attached to said equipment wherein a portion of said flexible cable adjacent said plate is held in a position substantially parallel to the base of said equipment.

3. A device as described in claim 1 comprising:
   a. said cable is formed with a second enlarged head permanently affixed to the other end of said cable;
   b. said equipment attachment means consists of an equipment-cable hold plate adapted for attachment by fasteners to said appliance or equipment and formed with an offset portion for receiving said second enlarged head;
   c. said offset portion having an opening therethrough for receiving said first head and cable therethrough but having a diameter less than the diameter of said second head; and
   d. said cable having a length preventing substantially all movement of said equipment or appliance away from the surface of said anchoring object.

4. A theft protection device for appliances or other portable equipment having a housing base formed with an opening therein for locked connection to an anchoring object having an opening therethrough, the device comprising:
   a. an elongated flexible cable threadably inserted through said opening in said portable equipment housing said opening in said anchoring object and having a first enlarged cable head permanently affixed to one end and a second enlarged cable head permanently affixed to the other end of said cable;
   b. said second cable head having a diameter greater than said opening in said housing of said appliance or equipment and said first cable head having a diameter smaller than said openings in said housing of said appliance or portable equipment and said anchoring object;
   c. a hold-down arm having a slot therein having a width greater than the diameter of said flexible cable for receiving said cable through said slot but less than the diameter of said first cable head for preventing passage of said head through said slot;
   d. means mounted on said anchoring object on a face opposite that of said appliance for holding said hold-down arm stationary relative to said anchoring object and in a position in alignment with said opening in said anchoring object;
   e. a lock cover connected to said anchoring object and shielding said hold-down arm, first enlarged head and said means for holding said hold-down arm relative to said anchoring object;
   f. lock means for securing said lock cover stationary relative to said anchoring object; and
   g. said cable having a length permitting only minimal movement of said appliance or equipment away from the surface of said anchoring object.

5. A device as described in claim 4 comprising:
   a. a securing lock plate adapted for connection to the underside of said anchoring object and connected to said means for holding said hold-down arm and having a base and downwardly turned flanges around the entire base; and
   b. said lock cover including a top and upwardly extending sides dimensioned for nesting with the flanges on said base.

6. A device as described in claim 5 comprising:
   a. said means for holding said hold-down arm includes a plurality of studs connected to said base and extending outwardly therefrom:
   b. said hold-down arm having openings formed therein for registration with said studs; and
   c. means for releasably attaching said hold-down arm to said studs.

7. A device as described in claim 6 comprising:
   a. a bushing dimensioned for insertion through said opening in said anchoring object and having an inside diameter for receiving said first enlarged head and cable therethrough;

b. said bushing having a flange on the end adjacent said cable end with said second enlarged head adapted for contacting the upper surface of said anchoring object;

c. said end adjacent said securing plate being threaded for receiving a threaded nut adapted for holding said base against the underside of said anchoring object; and d. said bushing having a length such that the end adjacent said first cable end terminates just short of said hold-down arm.

8. A device as described in claim 7 comprising:

a. said hold-down arm is formed with an elongated slot therein; and b. said lock means includes a lock bar dimensioned for movement through said elongated slot in said hold-down arm in a first position; and for locking engagement with said hold-down arm when rotated in a second position.

9. A theft protection device for appliances or other portable equipment having a housing base formed with an opening therein for locked connection to an anchoring object having a pair of openings therethrough, the device comprising:

a. an elongated flexible cable threadably inserted through said opening in said housing of said portable equipment and through said pair of openings in said anchoring object and having a first enlarged cable head permanently affixed to one end and a second enlarged cable head permanently affixed to the other end;

b. a hold-down arm having a pair of spaced slots therein for receiving said cable therethrough wherein said slots have a width greater than the diameter of said flexible cable but less than the diameters of said first and second cable heads for preventing passage of said heads through said slots;

c. means mounted on said anchoring object on a face opposite that of said appliance for holding said hold-down arm stationary relative to said anchoring object and in a position in alignment with said openings in said anchoring object;

d. said cable having a length sufficient to have said ends held by said hold-down arm and to loop through said opening in said portable equipment or appliance;

e. said cable heads having diameters less than said opening in said appliance or equipment and said openings in said anchoring object;

f. a lock cover connected to said anchoring object and shielding said hold-down arm, said enlarged heads and said means for holding said hold-down arm relative to said anchoring object; and g. lock means for securing said lock cover stationary relative to said anchoring object.

10. A device as described in claim 9 comprising:

a. a securing lock plate adapted for connection to the underside of said anchoring object and having a base and downwardly turned flanges around the entire base;

b. said lock cover including a top and upwardly extending sides dimensioned for nesting with the flanges on said base;

c. said means for holding said hold-down arm includes a plurality of studs connected to said base and extending outwardly therefrom;

d. said hold-down arm having openings formed therein for registration with said studs;

e. means for releasably attaching said hold-down arm to said studs;

f. a pair of bushings dimensioned for insertion through said openings in said anchoring object and having an inside diameter for receiving said first enlarged head and cable therethrough;

g. said bushings having a flange on the end adjacent said appliance or equipment for contacting the upper surface of said anchoring object;

h. said ends of said bushings adjacent said securing plate being threaded for receiving a threaded nut adapted for holding said base against the underside of said anchoring object;

i. said bushings having a length such that the ends adjacent said securing plate terminate just short of said hold-down arm;

j. said hold-down arm is formed with an elongated slot therein; and k. said lock means includes a lock bar dimensioned for movement through said elongated slot in said hold-down arm in a first position, and for locking engagement with said hold-down arm when rotated in a second position.

* * * * *